United States Statutory Invention Registration [19]

[11] Reg. Number: H550

Hester et al.

[43] Published: Dec. 6, 1988

[54] APPARATUS FOR SENSING AXIAL AND TANGENTIAL FORCES EXERTED ON A SPOOL OF DATALINK FILAMENT

[75] Inventors: Troy L. Hester, Huntsville; C. Denise Overstreet, Decatur, both of Ala.

[73] Assignee: The United States of America as represented by the Secretary of the Army, Washington, D.C.

[21] Appl. No.: 208,932

[22] Filed: Jun. 20, 1988

[51] Int. Cl.[4] ..... G01L 5/14; G01L 1/22

[52] U.S. Cl. ..... 73/167; 73/862.65

*Primary Examiner*—Charles T. Jordan

*Attorney, Agent, or Firm*—Freddie M. Bush; Howard G. Garner

[57] ABSTRACT

Apparatus for sensing and measuring axial force and torsional force exerted on a spool of fiber optic datalink filament as the filament is drawn off the spool at rates of speeds comparable to that experienced in the flight of a missile. The apparatus includes support means for supporting the spool, which includes an elongated shaft mounted on a plurality of elongated supporting members. Each of the supporting members has a first flex portion of reduced thickness which permits the support member to flex along the longitudinal axis of the support shaft and a second flex portion of reduced thickness which permits the support member to flex transversely of the longitudinal axis of the support shaft. Strain sensor bridges are used to convert the flexing of the flexed portions into electrical signals which are accumulated in a microprocessor and converted to signals to indicate the axial and torsional forces exerted on the spool during the pay out of the filament from the spool. The testing apparatus includes means for withdrawing filament from the spool at rates comparable to that experienced during the flight of a missile.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR SENSING AXIAL AND TANGENTIAL FORCES EXERTED ON A SPOOL OF DATALINK FILAMENT

DEDICATORY CLAUSE

The invention described herein may be manufactured, used, and licensed by or for the U.S. Government for governmental purposes without the payment to us of any royalties thereon.

BACKGROUND OF THE INVENTION

This invention relates to a device for measuring the axial and tangential forces exerted on a spool of fiber optic datalink filament as the filament is drawn off of the spool at predetermined rates. The spool of datalink filament is adapted to be carried by a guided missile and paid out as the missile flies from its launching point to a target. The fiber optic datalink filament connects the missile to a guide and ground control mechanism at the launch site. A description of a typical missile utilizing the fiber optics for guidance purposes is found is U.S. Pat. No. 4,185,796.

When preparing spools of datalink filament for use in such missiles it is important to prepare the spool with the proper degree of resistance to sloughing off the spool during flight while at the same time permitting paying out of the filament during the flight of the missile. Since it is difficult to measure the forces exerted on the filament and the spool during the flight of the missile itself it has been proposed to measure these forces on a ground test apparatus as the filament is withdrawn from the spool at speeds comparable to those exerted on it during the flight of the missile itself.

It has been recognized that a force and torque sensing spool fixture is required to measure the forces of interest imparted to the spool during flight. A previous system has been developed by Hughes Aircraft to solve this problem. The Hughes system addressed this problem by supporting the spool by means of a bushing or bearing to isolate the loads due to the weight of the spool itself. Force transducers of various types were then attached to the support shaft of the spool to measure the forces of interest. A problem with the Hughes Aircraft system was that the desired signal levels are so small that they were swamped by hysteresis in the measurement system, due to friction in the supporting members bushings, bearings and the like. This rendered the fixture of Hughes inadequate for measuring the forces of interest.

Another system, developed by Optelecom, Inc., supported the spool on a shaft which, in turn, was suspended by air bearings. Data is not available on the success of this system but the added complexity of air bearings makes the system inconvenient to use in the laboratory.

SUMMARY OF THE INVENTION

It is an object of the invention to provide apparatus for accurately testing the axial and tangential forces exerted on a stationary spool of datalink filament as the filament is being withdrawn from the spool at rates comparable to those encountered in the flight of a missile.

It is another object of the invention to provide apparatus for sensing the axial and tangential forces exerted on a spool of fiber optic datalink filament as the filament is drawn off the spool at a rate comparable to that experienced during the flight of a missile wherein the spool is supported on a fixed support and avoids the hysteresis generated due to friction in bushings, bearings, and the like.

The present invention comprises strain sensor bridges for converting mechanical deflections, caused by axial and tangential forces exerted on the support for the spool, into electrical signals which correspond to the amount of mechanical deflections in the support of the spool. The unique design allows the sensing members to also serve as the supporting members and eliminates the need for bearings, bushings and the like. The device also allows for isolation of unwanted forces, from the measured forces, while avoiding the sensitivity and hysteresis problems encountered by previous devices.

The apparatus of the invention is designed to sense forces along, and torques about the axis of the spool. The forces along the axis of the spool was expected to be less than 100 grams. The problem of measuring the two axes of force (axial and torsional) has been solved by using support members each of which have two mutually orthogonal flexure elements machined into them. Four of the supporting members are used to support a central shaft on which the flight spool is mounted. The supporting members are arranged so that the cross section of the supporting structure in the plane of the axis of the spool is a rectangle, and the cross section of the supporting structure normal to the axis is a triangle. The arrangement of these members and the central shaft resembles a saw horse.

Forces along the axis of the spool tend to cause the rectangle to be formed into a parallelogram, with one end of a support member translating with respect to the other end. Forces normal to the axis of the spool such as the moment caused by the weight of the spool are applied to the triangular structure where they are distributed along the axes of the supporting members. The members are not allowed to flex due to the weight of the spool. Therefore, the only deflection in the flexure elements is that caused by axial tension or compression, which is small compared to that caused by flexing.

The tangential forces at the peel point are obtained, indirectly, by measuring the torque imparted to the spool, and using other information to calculate the moment through which the tangential forces operate. The actual measured quantity is the torque about the spool axis. Torque about the spool axis causes relative translations of the ends of the support members in a direction orthogonal to those caused by axial forces. The translations cause deflections in the flexure elements whose planes are parallel to the spool axis.

BRIEF DESCRIPTION OF THE DRAWINGS

The invention will now be described in connection with the appended drawings, wherein.

DETAILED DESCRIPTION OF THE DRAWING

Figure 1:
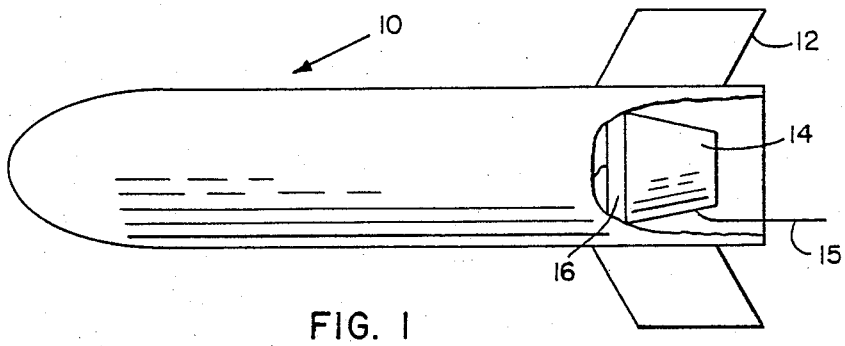
FIG. 1 is a schematic view of a missile carrying a spool of fiber optic datalink filament, with parts of the missile broken away to illustrate the mounting of the spool.

Referring now to FIG. 1 of the drawings, wherein a missile 10 is illustrated diagrammatically and comprises guides fins 12 for guiding the flight of the missile. Supported inside the missile 10 is a spool 14 of fiber optical datalink filament 15. The spool 14 is supported on a spool support 16. Filament 15 is guided out the rear end of the missile 10 as the missile flies in its flight. One end of filament 15 is connected to the controls of the missile while the other end, extending out the rear end of the missile, is connected to a guidance and ground control set, not shown in the drawings. As missile 10 flies towards its target, filament 15 is paid off spool 14 and conveys guidance information from the missile to the ground control and from the ground control to the missile so that the missile might be continually guided towards its target, in a manner well known and described in detail in U.S. Pat. No. 4,185,796, issued Jan. 29, 1980 to Leon H. Riley.

It is to be understood that filament 15 and spool 14 are pretreated to prevent the filament from sloughing off spool 14 as the missile 10 is handled, or in its flight. Undue sloughing of the filament from the spool 14 during flight would cause an entanglement of the filament and result in a broken filament and an unguided missile.

Figure 2:
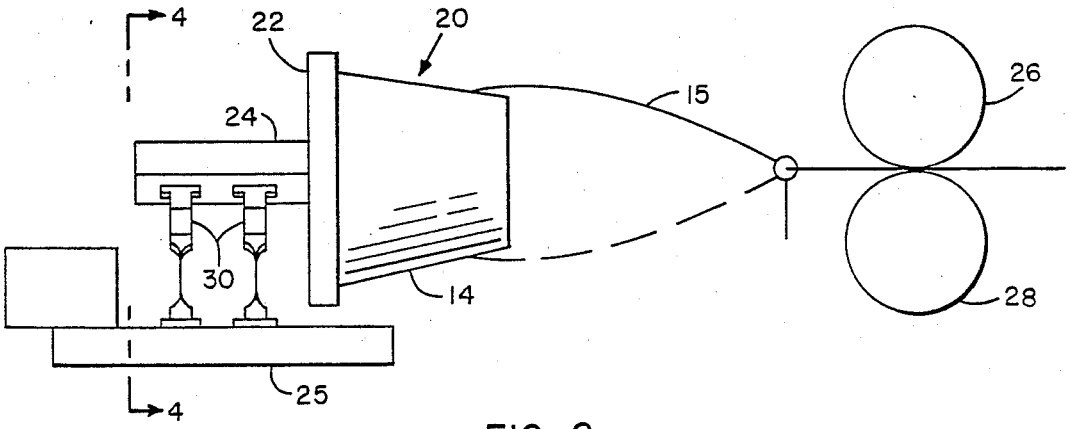
FIG. 2 is a schematic side elevation of the testing apparatus of the invention.

Referring now to FIG. 2 of the drawings, wherein is illustrated the testing apparatus of the invention. Testing apparatus 20 comprises a test spool support 22 which, in turn, is supported by a spool support shaft 24. As can be seen from FIG. 4, support shaft 24 is square in cross section so as to present symmetrical surfaces for the support members 30. The test spool support shaft 24 is supported on a base 25 by means of a plurality of support members 30. The configuration of support members 30 will be described in greater detail hereinafter.

Spool 14 is supported on support surface 22 with its longitudinal axis lying generally in the horizontal plane. The test apparatus includes draw off rollers 26 and 28 for drawing off filament 15 from spool 14 at rates of speed comparable to the pay off from the spool when the missile is in flight.

Figure 3:
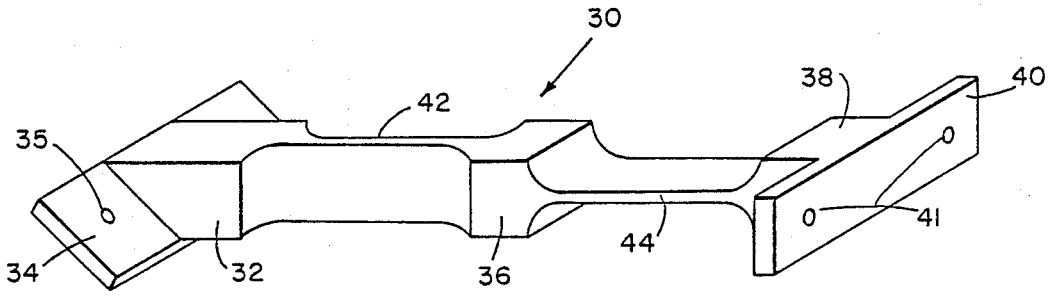
FIG. 3 is a perspective view of the combined sensing and support member of the invention.
Figure 4:
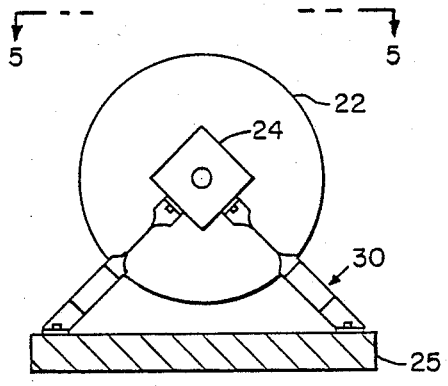
FIG. 4 is a rear elevation of the testing apparatus of the invention, taken along line 4—4 of FIG. 2.

Referring now to FIG. 3 of the drawings, it will be appreciated that each of support members 30 are identical to the member illustrated in FIG. 3. Each of the support members 30 have a lower portion 32, of a generally rectangular cross section and a foot portion 34 having a pair of openings 35 for attaching the foot portion to base 25, as seen in FIG. 2. Each of the support members 30 also has an intermediate portion 36, which also has a generally rectangular cross section. The support member 30 also has an upper portion 38 of a generally rectangular cross section and a head portion 40 with a plurality of openings 41 for attachment to spool support shaft 24, as seen in FIGS. 2 and 4.

Interposed between intermediate portion 36 and lower portion 32, is an axial flex portion 42 which permits movement of the spool along its longitudinal axis, as seen in FIG. 2. Interposed between intermediate portion 36 and upper portion 38 is a torque flex portion 44, which is adapted to permit the support to flex whenever a torque is applied to spool 14, as seen in FIG. 2.

It will be appreciated that as rolls rollers 26 and 28 draw filament 15 from spool 14, an axial force will be exerted, causing spool support 22 to move along the longitudinal axis of support shaft 24, thereby causing axial flex portion 42 to be deflected. It will also be appreciated that as filament 15 is drawn off of spool 14, as seen in FIG. 2, a torque will be applied to spool 14, attempting to rotate or twist the spool about its longitudinal axis. This torquing or twisting action causes flex portion 44 to be deflected.

Support shaft 24 and support members 30 may be made from solid aluminum bar with flex portions 42 and 44 machined into the bar that forms the support member 30.

Figure 5:
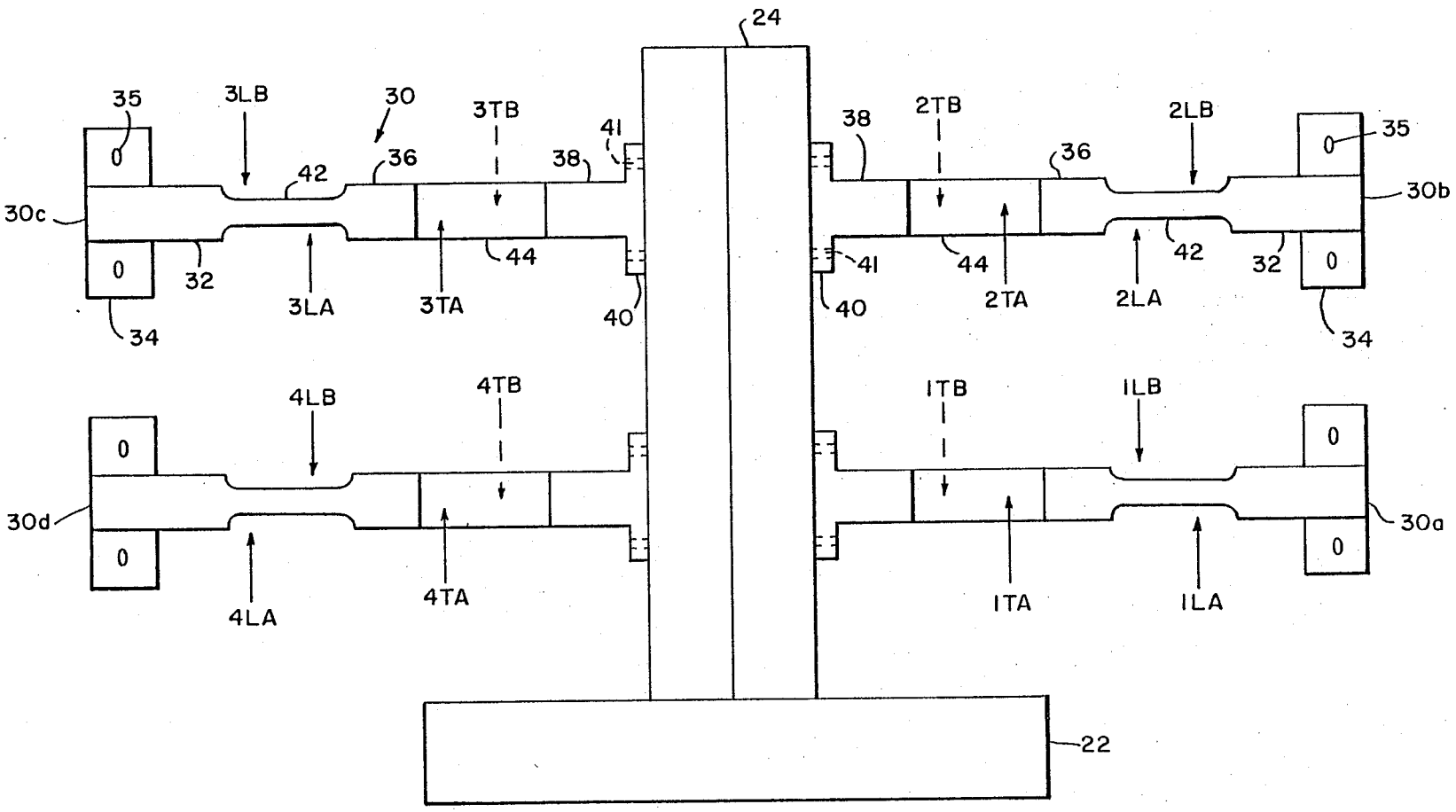
FIG. 5 is a schematic plan view, taken along line 5—5 of FIG. 4, illustrating the placement of the strain sensors.

Referring now to FIG. 5 of the drawings, wherein a plan view of the support shaft 24, and the support members 30, are illustrated. In this Figure, for clarity, the four support members are designated by reference characters 30*a*, 30*b*, 30*c* and 30*d*. On support member 30*a*, piezo-resistive strain sensors 1 LA, 1 LB are located on opposite sides of axial flex portion 42 and piezo-resistive strain sensors 1 TA and 1 TB are located on opposite sides of radial flex portion 44. Flex portion 42 of support member 30*b* is likewise equipped with sensors 2 LA and 2 LB and flex portion 44 is likewise equipped with sensors 2 TB and 2 TA.

On the other side of the support shaft 24, support member 30*c* has sensors 3 LA and 3 LB applied to opposite sides of flex portion 42 and sensors 3 TA and 3 TB applied to opposite sides of flex portion 44. In like fashion, support member 30*d* has sensors 4 LA and 4 LB applied to opposite sides of flex portion 42 and sensors 4 TA and 4 TB applied to opposite sides of flex section 44. When the flex portions on which the sensors are mounted, experience a deflecting force along their longitudinal axes the values of the sensors change. For a given deflection, the values of sensors 1 LA, 1 LB, 4 LA, 4 LB increase and the values of sensors 2 LA, 2 LB, 3 LA and 3 LB decrease.

Figure 6:
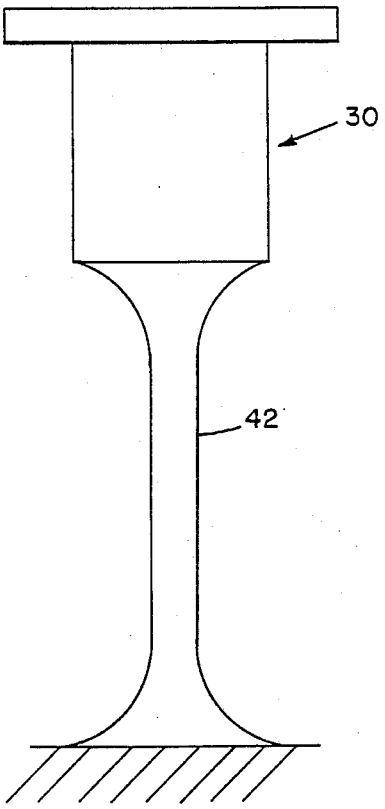
FIG. 6 is a schematic view of one of the flexure portion of the combined support and sensing element, showing no deflection.
Figure 7:
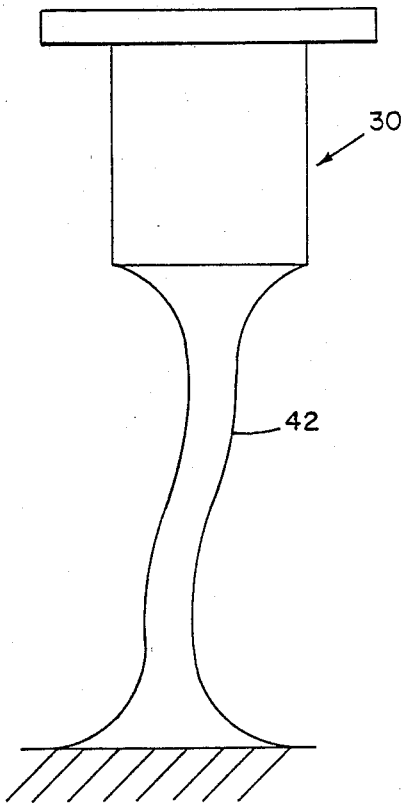
FIG. 7 is a view of the flexure portion similar to that shown in FIG. 6 but showing the effect of deflection of the flexure portion.

As can be seen in FIG. 6, when each of the support members are under no force, either axially or torquewise, the flex portion 42 (for example) remains straight and is not subject to any deflection. However, when a force is exerted on the support member 30, to cause the deflection as seen in FIG. 7, the flex portion of support member 30 will be compressed on one side and tensioned on the other, and, vice versa, on the lower portion. Therefore, the sensors will sense the deflection, and will increase or decrease the value of the sensors.

Figure 8:
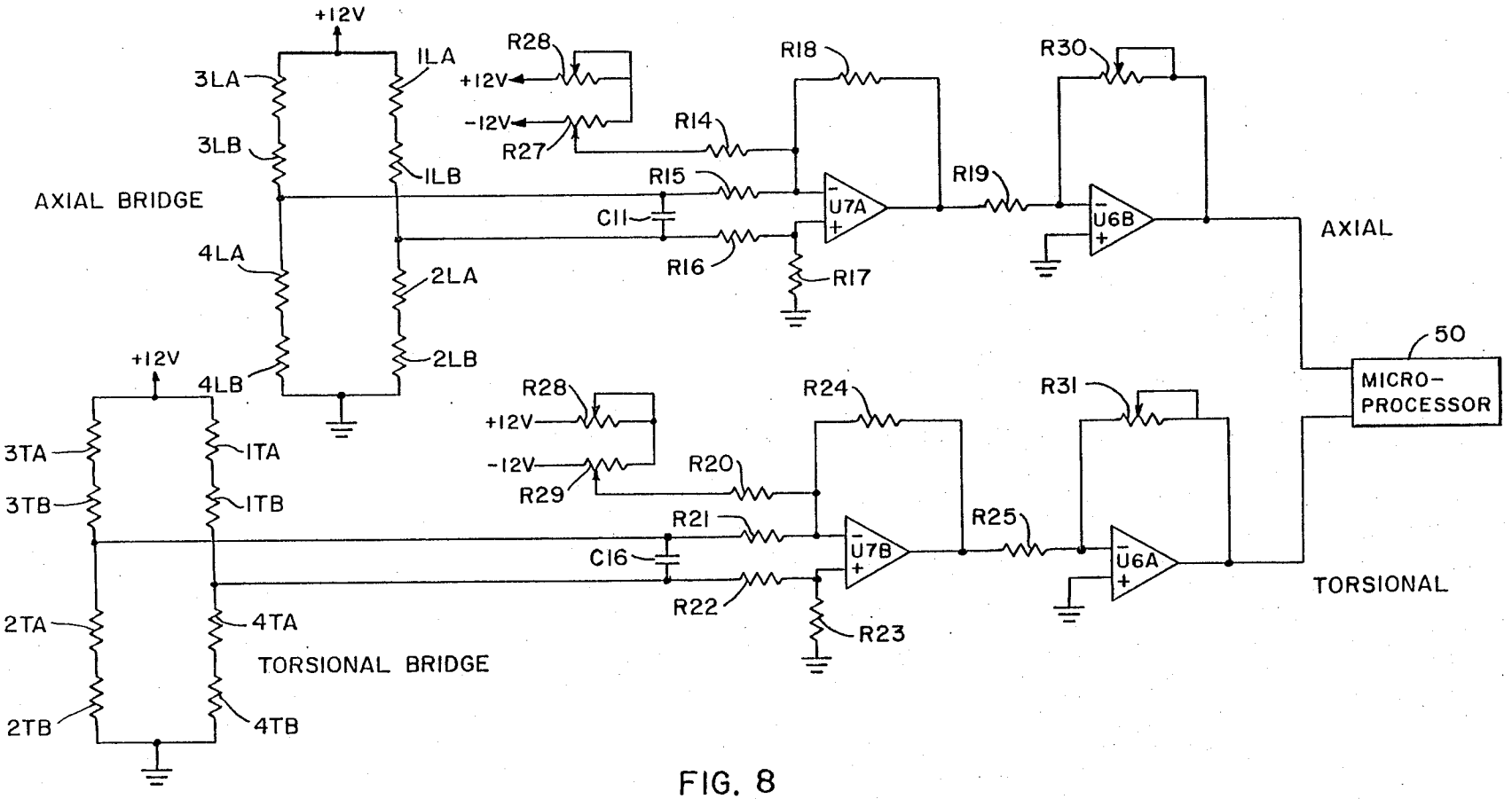
FIG. 8 is a schematic wiring diagram showing both the axial and the torsional bridges of the invention.

Referring now to FIG. 8 wherein the sensors are arranged in two separate bridges; one comprising sensors 1 LA, 1 LB, 2 LA, 2 LB, 3 LA, 3 LB, 4 LA and 4 LB into an axial bridge, and the other, sensors 1 TA, 1 TB, 2 TA, 2 TB, 3 TA, 3 TB, 4 TA, and 4 TB into a torsional bridge. As noted above, wherever the flex portions are deflected, the values of some sensors increase while others decrease. These changes in value cause a differential change in the voltage level at the two single output points.

The differential signals are connected to a differential amplifier U 7A, which corrects for large offsets in the differential signal caused by inadvertent preloading during assembly of the apparatus. The differential amplifier has a gain of −1 and uses coarse and fine offset adjustment resistors (R 27 and R 26 respectively). The next stage (U 6B) is the scaling amplifier. The scaling amplifier provides an adjustable gain of zero to twenty and is adjustable through R 30. The scaling amplifier permits an adjustment of the instrument and sets an appropriate scaling factor. This stage also provides the final output to connector J 11 for recording during operation.

The operation of the torsional bridge and amplifier, in the lower portion of FIG. 8, is identical to that described hereinabove for the axial bridge and the translation of the opposite ends of the flexure portion causess s-bending bending in the flexure portion, as illustrated in FIG. 7. This is not a monotonic bend such as would occur if the ends of the support members were not constrained from rotating. This has subtle but important implications in selecting the mounting location for the strain sensors. When the S-bending occurs, one-half of the given flexure portion surface will be in tension while the other half is in compression. The inflection point of the S-bend would have no net deformation due to the surface tension or compression. This point will be near the center of the element for a uniformly machined flex portion. If a strain sensor was placed in the exact center of the flex portion, across the inflection point of the S-bend, it would experience both compression and tension along its length, which would tend to cancel out any signal. For this reason, the strain sensors on the support members are mounted offcenter.

Piezo-resistantive strain sensors have been selected as the transducer elements for the support members because of their high sensitivity which has yielded a greater signal-to-noise ratio. The likelihood of use of the apparatus in an environment where the EMI may be coupled into the system through the structural components makes the feature of greater signal-to-noise ratio attractive.

It will be understood that the signals generated by each of the bridges, that is the torsional bridge and the axial bridge, are fed into a microprocessor 50 where they are analyzed and converted to an appropriate display, indicative of the torque or axial force exerted on the spool during the withdrawal of the filament therefrom.

It will be understood that changes may be made in the structure of the testing device of the invention without departing from the scope of the invention as defined by the appended claims.

We claim:

1. Apparatus for sensing and measuring axial force and torsional force exerted on a spool of fiber optic datalink filament as said filament is drawn off said spool at a rate of speed comparable to that experienced during the flight of a missile, to which said spool is adapted to be attached, comprising:

(a) a mount for supporting said spool, centrally disposed on the end of an elongated shaft, said shaft having a longitudinal axis extending generally traversely of said mount;

(b) a plurality of elongated supporting members, symmetrically spaced about said elongated shaft, each having one end attached to said elongated shaft and its other end affixed to a base plate, to provide the sole support for said elongated shaft and said mount, each of said elongated members having a first flex portion of a reduced thickness for permitting flex along its longitudinal axis whenever a force is applied along the longitudinal axis of said shaft and a second flex portion of reduced thickness for permitting flex at an angle to its longitudinal axis when a torsional force is applied to said mount for supporting said spool;

(c) first sensing means disposed on each of said supporting members, in said first flex portion, for sensing the deflection of said members in a direction along the longitudinal axis of said shaft;

(d) a second sensing means disposed on each of said supporting members, in said second flex portion, for sensing the deflection of said member in a direction at an angle to the longitudinal axis of said shaft;

(e) means for receiving signals from said first and second sensing means, and for indicating the forces exerted on said members as said filament is drawn off said spool; and (f) means for drawing said filament off said spool at a rate of speed comparable to that experienced during the flight of a missile to which a said spool may be attached.

2. Apparatus as set forth in claim 1, wherein said elongated shaft has a rectangular cross section.

3. Apparatus as set forth in claim 1, wherein said elongated shaft has two longitudinal extending planar surfaces which extend at an angle to said base plate.

4. Apparatus as set forth in claim 1, wherein said elongated shaft is supported by four elongated supporting members.

5. Apparatus as set forth in claim 4, wherein each of said supporting members are attached to the elongated support shaft and to said base and whose longitudinal axes extend from said base in intersecting planes.

6. Apparatus as set forth in claim 5, wherein said longitudinal axial planes of said supporting members intersect generally at the longitudinal axis of said support shaft.

7. Apparatus as set forth in claim 5, wherein said elongated supporting members extend from said base at an angle of 45°.

8. Apparatus as set forth in claim 1, wherein said first and second sensing means comprises a piezo-resistive strain sensor located on each side of said support member flex portions.

9. Apparatus as set forth in claim 8, wherein the sensors of said first sensing means are arranged in an axial bridge.

10. Apparatus as set forth in claim 8, wherein the sensors of said second sensing means are arranged in a torsional bridge.

* * * * *